United States Patent [19]

Tsai

[11] Patent Number: 5,420,946
[45] Date of Patent: May 30, 1995

[54] MULTIPLE CHANNEL OPTICAL COUPLING SWITCH

[76] Inventor: Jian-Hung Tsai, 10095 Bret Ave., Cupertino, Calif. 95014

[21] Appl. No.: 28,398

[22] Filed: Mar. 9, 1993

[51] Int. Cl.⁶ .............................................. G02B 6/26
[52] U.S. Cl. ...................................... 385/22; 385/26; 385/16; 385/47
[58] Field of Search .................................. 385/15-23, 385/33-38, 47, 26

[56] References Cited

U.S. PATENT DOCUMENTS

| | | | |
|---|---|---|---|
| 4,220,396 | 9/1980 | Antell | 350/96.15 |
| 4,261,638 | 4/1981 | Wagner | 385/22 |
| 4,322,126 | 3/1982 | Minowa et al. | 385/18 |
| 4,447,118 | 5/1984 | Mulkey | 385/26 |
| 4,452,507 | 6/1984 | Winzer | 350/96.20 |
| 4,626,066 | 12/1986 | Levinson | 385/18 |
| 4,896,935 | 1/1990 | Lee | 385/22 |
| 4,938,555 | 7/1990 | Savage | 385/18 |

FOREIGN PATENT DOCUMENTS

| | | | |
|---|---|---|---|
| 2581204 | 10/1986 | France | 385/25 |
| 3147873 | 6/1983 | Germany | 385/22 |
| 0072108 | 4/1983 | Japan | 385/25 |

Primary Examiner—Rodney B. Bovernick
Assistant Examiner—Phan Thi Heartney Palmer
Attorney, Agent, or Firm—Lyon & Lyon

[57] ABSTRACT

An optical coupling device for coupling light into a selected output fiber. The input fiber is optically aligned with one of a plurality of output fibers via a reflector. By rotating a reflector about an axis, the input light beam can be reflected to a selected output fiber. The input fiber and all the output fibers are in fixed position relative to each other.

28 Claims, 9 Drawing Sheets

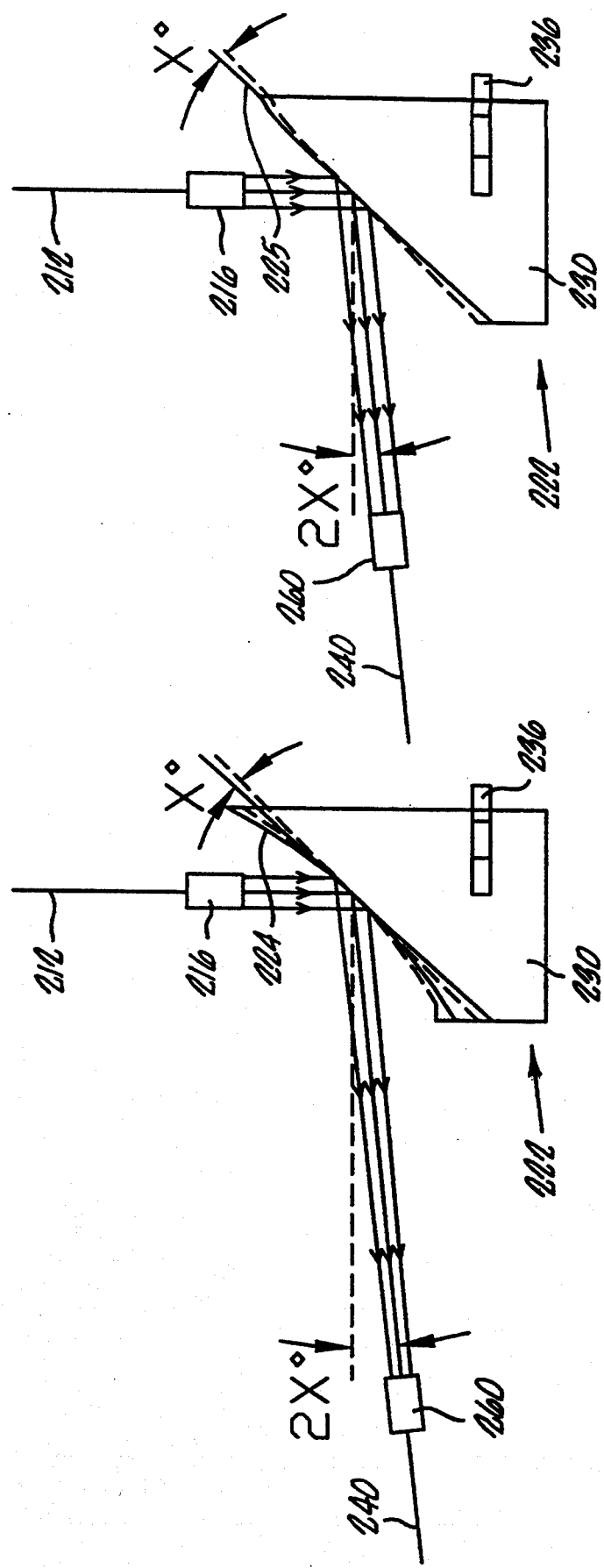

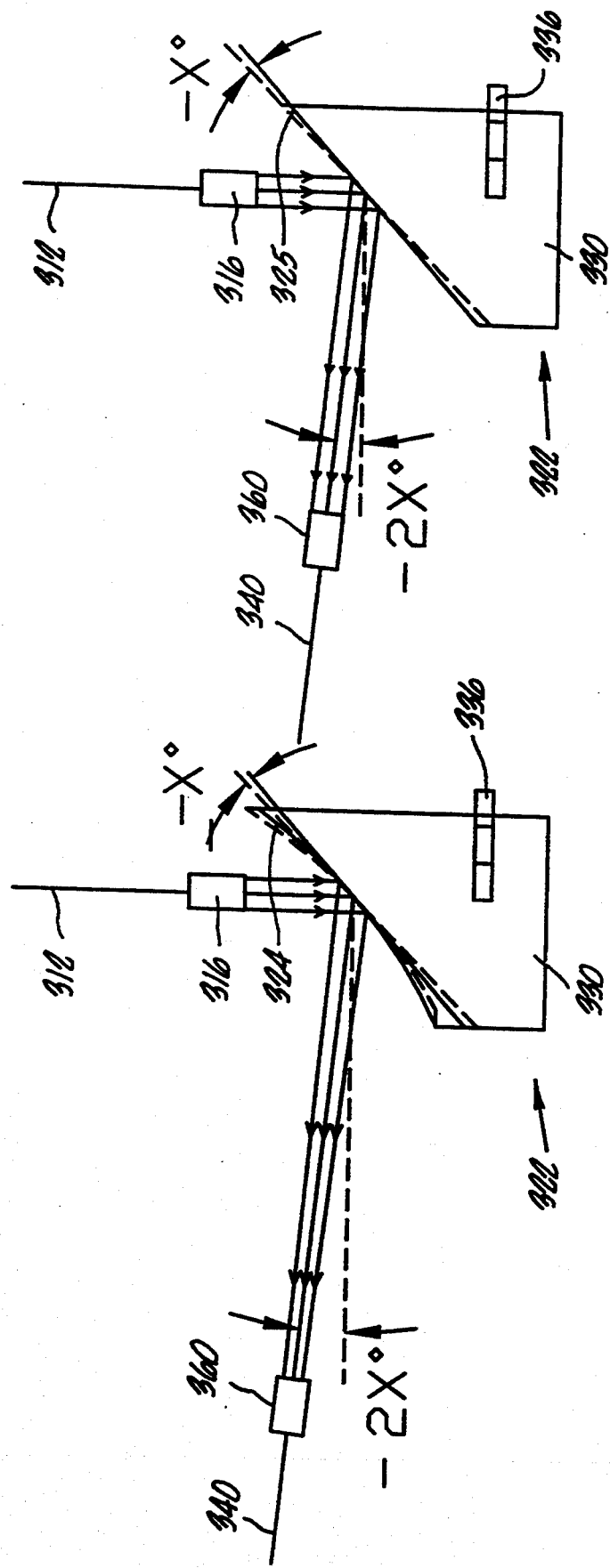

MULTIPLE CHANNEL OPTICAL COUPLING SWITCH

BACKGROUND OF THE INVENTION

1. Field of the Invention

This invention relates generally to optics and more particularly concerns an optical coupling device.

2. Description of the Prior Art

In conventional optical systems, there is only one light detector for every light source and therefore only one light path. In the prior art, when a light source output needed to be switched among more than one optical device (e.g., an optical fiber), it was either connected to a multi-channel optical coupler or switched manually.

In prior art multi-channel optical couplers, high insertion loss and optical directivity problems exist. These problems render prior art multi-channel solutions unstable and uneconomical. In prior art manual switching solutions, each switch requires connection and disconnection of the optical device. This renders prior art manually switched solutions inconvenient and unreliable. For all these reasons, it is desired to have a fiber optic coupling device that allows simple switching among multiple optical channels.

There is a need for an apparatus that allows many fiber optic components to be tested at same time. Examples of such components include connectors, cables, couplers and the like. Because the apparatus is used for testing purposes only (either short or long term testing), stability and repeatability are the most important characteristics of any solution.

An example of an optical system that uses a moving reflector assembly is disclosed in co-pending application, U.S. Ser. No. 08/028.304, filed of even date by the same inventor as this application. It is hereby incorporated by reference.

SUMMARY OF THE INVENTION

In an optical coupling device, stability and optical alignment are important characteristics. The invention combines optical input and output devices, grade refractive index (GRIN) lenses and a movable reflector assembly in a unique and novel fashion to provide a multi-channel fiber optic device with high stability, excellent alignment characteristics and high repeatability.

The invention comprises either multiple optical output devices and a single optical input device or the converse. The invention teaches a coupling device for optical component testing. The invention can be used in an optical system that requires optical light detector selecting.

In an embodiment of the invention, there is an optical input device and a plurality of optical output devices. A light beam emanating from the optical input device reflects off a reflector assembly to one of the plurality of optical output devices. The reflector assembly can be rotated about an axis such that it can reflect an input light beam to any one of the plurality of output fibers, thus providing the ability to transmit one optical signal to many different optical components.

Only the reflector assembly need be moved in order to have a specific output fiber receive the light beam. The optical input device and plurality of optical output devices are fixed. A control system controls the rotation of the reflector assembly. It provides the output fiber addressing capability.

A feature of the present invention, therefore, is the provision of an optical coupling device comprising a plurality of optical output devices disposed on a platform and a reflector assembly disposed in the center of the platform that has the optical output devices aimed thereat. There is also an optical input device disposed above the reflector assembly.

There is also a reflector assembly rotator that comprises a rotator axis. The reflector assembly rotator is capable of rotating the reflector assembly about the rotator axis such that the reflector assembly can reflect a light beam transmitted by the optical input device to a selected one of the plurality of optical output devices.

The above and other features of the invention, including various novel details of construction and combination of parts, will now be more particularly described with reference to the accompanying drawings and pointed out in the claims. It will be understood that the particular device embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of aspects of the invention, from which novel features and advantages will be apparent.

FIG. 8.1 and 8.2 are side views of an embodiment of the invention showing a light path with a mirror tilting at an angle of $+X$ degrees.

FIG. 9.1 and 9.2 are side views of an embodiment of the invention showing a light path with a mirror tilting at an angle of $-X$ degrees.

DETAILED DESCRIPTION OF THE INVENTION

Figure 1:
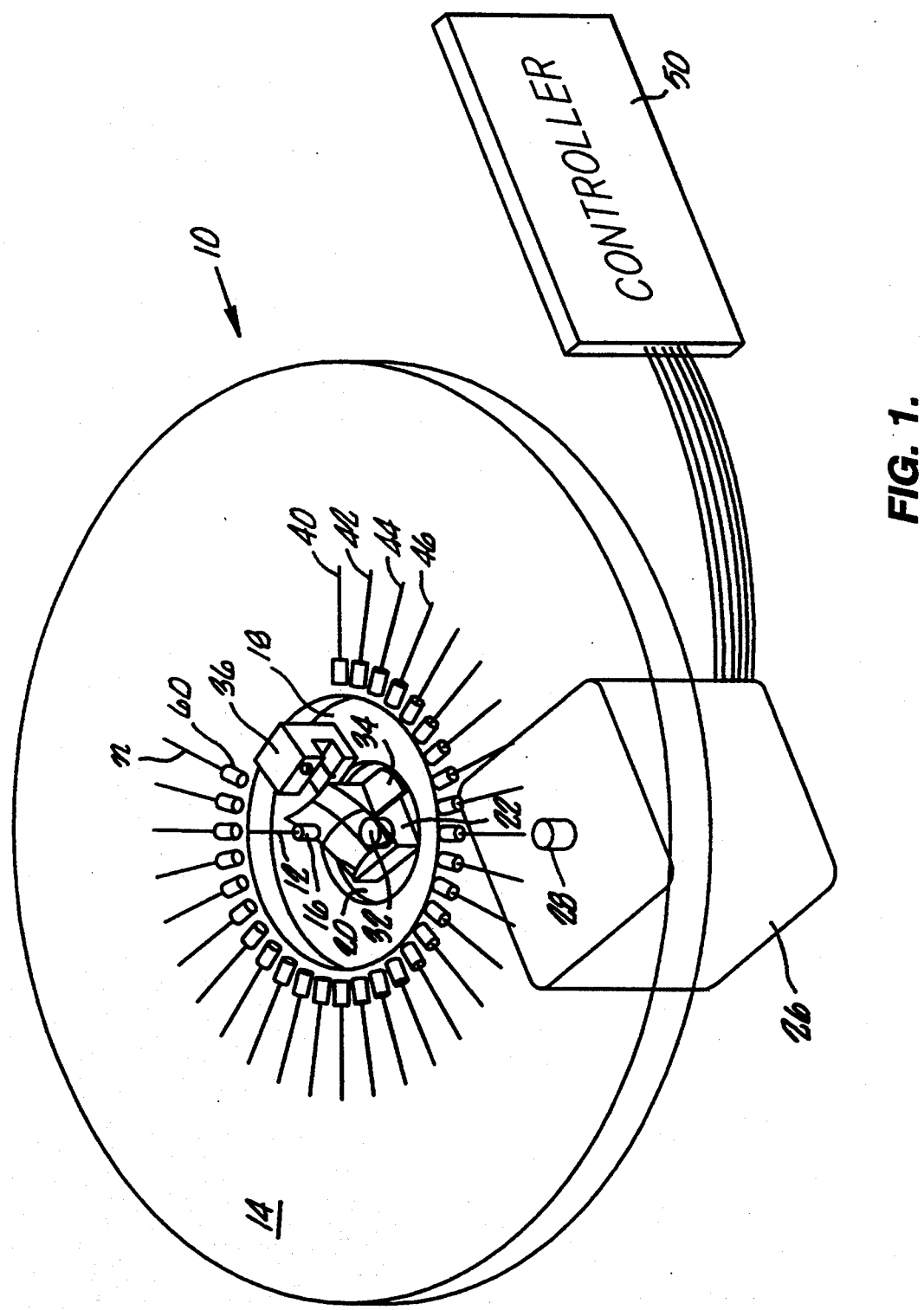
FIG. 1 is a perspective view of an embodiment of the invention showing a multi-channel fiber optic coupling device.

Referring to the drawings, and in particular, FIG. 1, there is seen an embodiment of a multi-channel fiber optic coupling device 10. There is an input fiber 12, which is fixed and perpendicular to a platform 14. Disposed on the input fiber 12 is a grade refractive index (GRIN) lens 16.

GRIN lenses, which are known in the prior art, are used as an aid in aligning the light beams. When placed in front of a transmitting optical fiber, GRIN lense 16 enlarges the emitted light beam between ten and one-hundred times (the light beam's diameter is enlarged from that of the fiber core to that of the GRIN lens). When a light beam strikes a GRIN lens 60, which is placed on the receiving end of a fiber, it focuses the light beam to a point in the fiber optic core. Thus, when a GRIN lens is placed on an optical fiber, alignment of the light beam is simplified, which increases stability. Insertion losses will also be very low. Additionally, GRIN lenses 16 have low return loss (back reflection), a desirable characteristic.

The platform 14 can be of any shape but is preferably a circular disk. The platform 14 has a recess 18 disposed in its center. The recess 18 is preferably circular. In the center of recess 18 is an insertion hole 20 through which a reflector assembly 22 is inserted therethrough. Also shown in FIG. 1 is a controller 50 used to implement a control system. The operation of controller 50 will be disclosed below.

Figure 2:
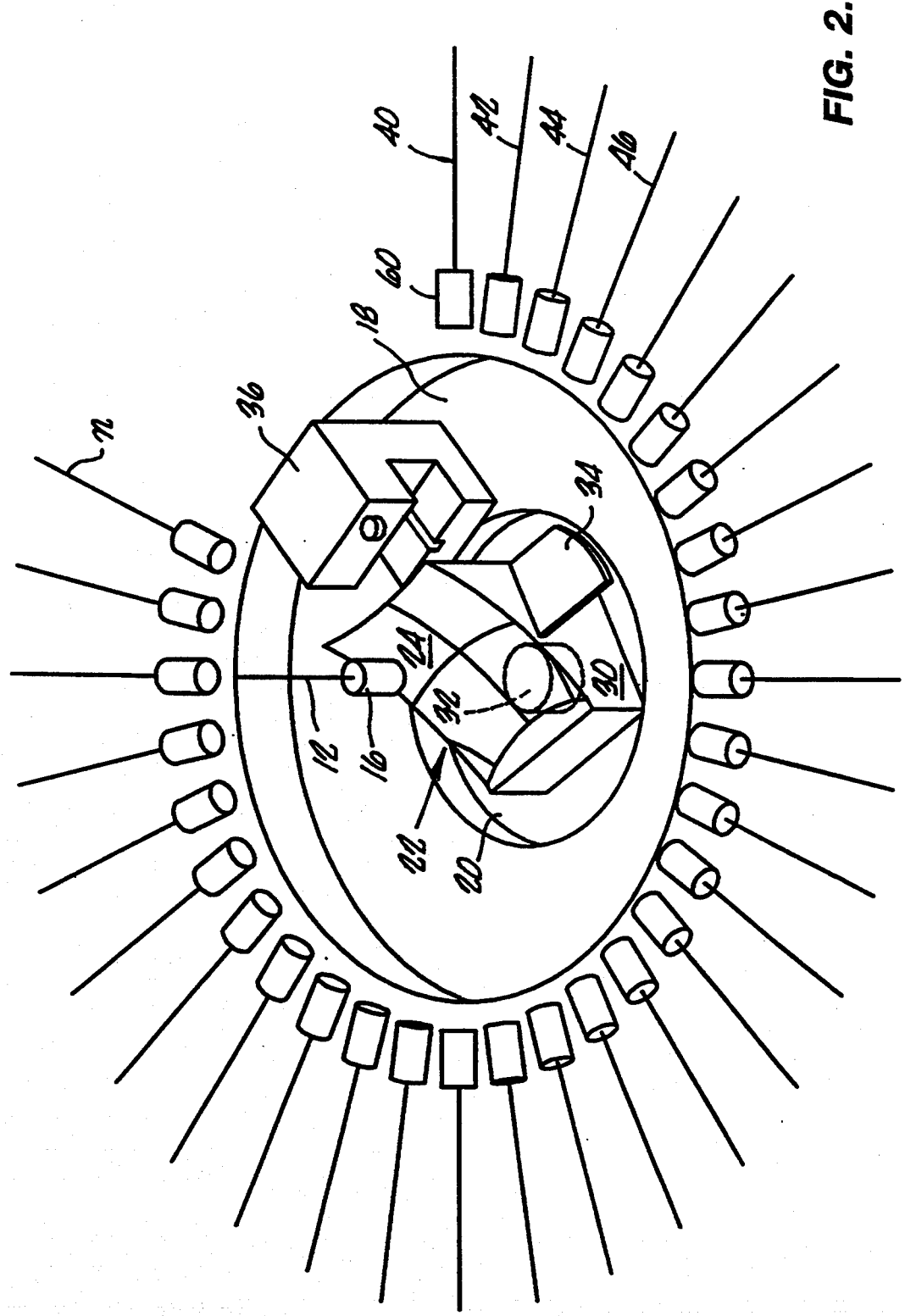
FIG. 2 is an expanded view of an embodiment showing an input fiber, rotating curved mirror and fixed output fiber apparatus.

FIG. 2 is an expanded view of the embodiment of FIG. 1 and will allow detailed description of reflector assembly 22. The reflector assembly 22 comprises a curved reflector 24 (which is preferably a front surface coated mirror), mounting base 30, mounting hole 32 and zero position plate 34. Curved reflector 24 is mounted on the top of mounting base 30 of the reflector assembly 22. The curvature of the reflector 24 is such that it is spherical, parabolic or elliptical. The reflector 24 is tilted such that its reflection plane is at a forty-five degree angle with respect to the input fiber 12.

A mounting hole 32 is formed in the underside of mounting base 30 and placed on the shaft 28 of motor 26. This mounting is executed such that when motor 26 rotates shaft 28, the reflector assembly 22 rotates as well. In order to maintain proper symmetry, input fiber 12, mounting hole 32 and shaft 28 are collinear with each other. Therefore, input fiber 12, mounting hole 32 and shaft 28 operate as an axis that reflector assembly 22 rotates about.

Figure 4:
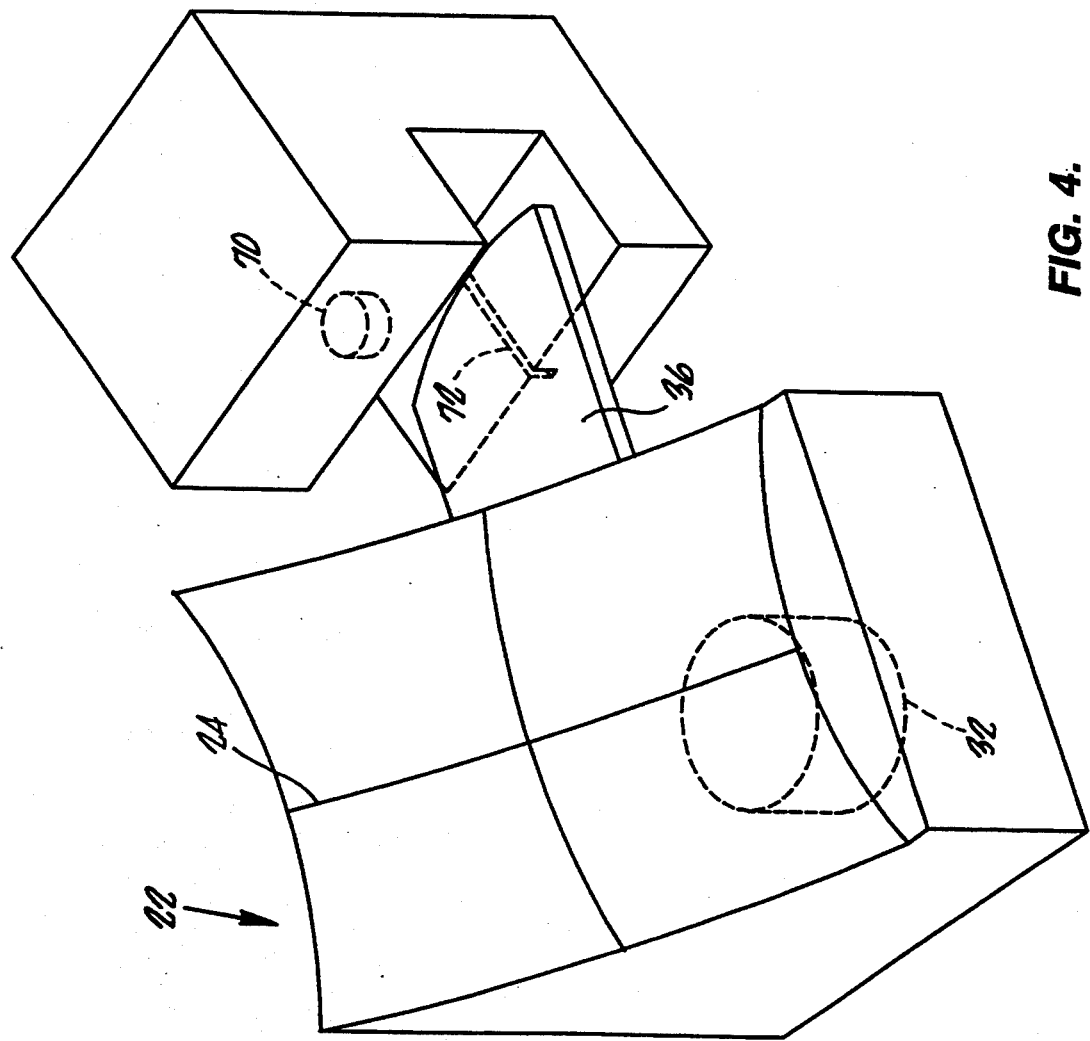
FIG. 4 shows a perspective view of the optical interrupter and reflector assembly.

As mentioned above, a zero position plate 34 is mounted on the reflector assembly 22. Zero position plate 34 is used in conjunction with optical interrupter 36 to determine the angular position of the reflector assembly 22. The optical interrupter 36 is shaped in a C-shape with a vertical tab and two horizontal tabs that form an integral unit. The vertical tab holds the horizontal tabs such that they are substantially parallel. The optical interrupter 36 is placed in recess 18 such that rotation of reflector assembly 22 causes zero position plate 34 to pass through the open space formed by the vertical and horizontal tabs, as shown in FIG. 4. The manner in which the zero position plate 34 and the optical interrupter 36 operate to provide reflector assembly 22 position control will be disclosed below.

There are n fixed output fibers (designated as reference numerals 40, 42, 44, 46 ... n). The output fibers 40 ... n are disposed on platform 14 in a circular, fixed fashion. They are arranged such that they are in optical alignment with a reflection point on reflector 24. The reflection point is the point where a light beam transmitted from input fiber 12 strikes the reflector 24 and reflects in a different direction. When aimed at the reflection point, the output fibers 40 ... n will receive the reflected light beam. Disposed on each output fiber 40 . .. n is a GRIN lens 60.

Note that the output fibers 40 ... n can be used as input devices, thereby converting input fiber 12 into an output device. This usage is for applications that require multiple input sources that are addressable to a single output. It is thereby understood throughout this application that reference to "output fibers 40 ... n" can also mean "input fibers 40 ... n" and reference to "input fiber 12" can also mean "output fiber 12".

When the reflector 24 is tilted such that its reflection plane is at a forty-five degree angle with respect to the input fiber 12, an input light beam will reflect off reflector 24 at a right angle (ninety degrees) from the input fiber 12. Therefore, the plurality of output fibers 40 ... n are be placed in the same plane, which is perpendicular to the input fiber 12. Because the output fibers 40 .. . n are all perpendicular to input fiber 12, they are all in the same plane. As discussed above, the output fibers 40 ... n are disposed in a circle with each fiber pointing to the reflection point on the reflector 24. In order to ensure symmetry, the reflection point coincides with the rotational axis of reflector assembly 22. Thus, the distance between each output fiber 40 ... n and the reflection point are equal. Because of this symmetry, additional output fibers 40 ... n can be added without making any adjustments to reflector assembly location or changing the distance between the reflection point and the output fibers 40 ... n.

Reflector assembly 22 is rotatable to a selected position, thereby controlling which output fiber 40 ... n receives the reflected input light beam. This control is obtained through use of the optical interrupter 36 and zero position plate 34. As shown in FIG. 4, optical interrupter 36 has a light source 70 disposed on one of the horizontal tabs and an optical detector 72 mounted opposite the light source on the other horizontal tab. Such light sources and optical detectors are well known in the art.

When the reflector assembly 22 is rotated by motor 26, it moves zero position plate 34 in a circular arc. When the zero position plate 34 enters the open space in optical interrupter 36, as shown in FIG. 4, the light beam transmitted by the light source 70 is broken. An external controller 50 is notified by the optical detector 72 that the light beam transmitted by the light source 70 has been broken. The external controller 50 then sets a flag which indicates that the reflector assembly 22 is in its zero (initial) position.

Since the external controller 50 controls the movement of the motor 26, the reflector assembly 22 can be rotated to a selected position such that a light signal from input fiber 12 can be reflected to a selected one of the plurality of output fibers 40 ... n. The external controller 50 is programmed with output fiber 40 ... n spacing and quantity information. It uses the zero position information in conjunction with the spacing and quantity information in order to select the proper amount of motor 26 rotation. When the controller 50 acts to cause the proper motor 26 rotation, the reflector assembly 22 becomes aligned such that an input light beam will reflect to the selected output fiber 40 ... n.

Figure 3:
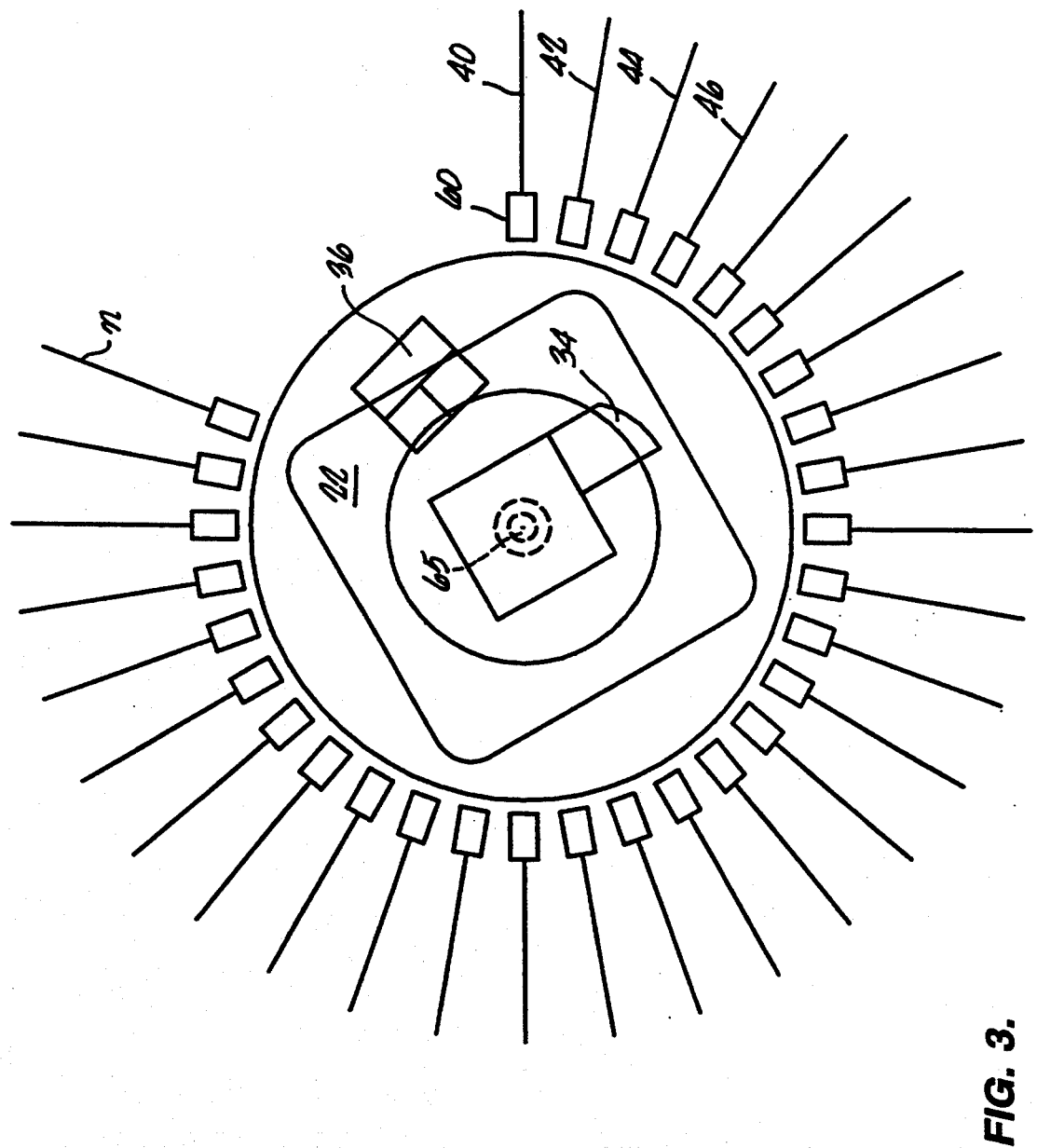
FIG. 3 shows a top view showing the output fiber layout.

FIG. 3 is the top view of the output fiber 40 ... n layout. It shows the output fibers 40 ... n arranged in a circular arrangement. The output fibers 40 ... n are aimed such that they point directly at the axis 65 formed by input fiber 12, mounting hole 32 and shaft 28 and the optical center of curved reflector 24. Therefore, a light beam transmitted by input fiber 12 will reflect off reflector 24 and go to the selected output fiber 40 ... n. The symmetrical design, which has the output fibers 40 ... n aimed at the axis 65, assures that the reflected light signal will strike the desired output fiber 40 ... n headon. This results in a coupler 10 with very high stability and excellent repeatability.

Figure 5:
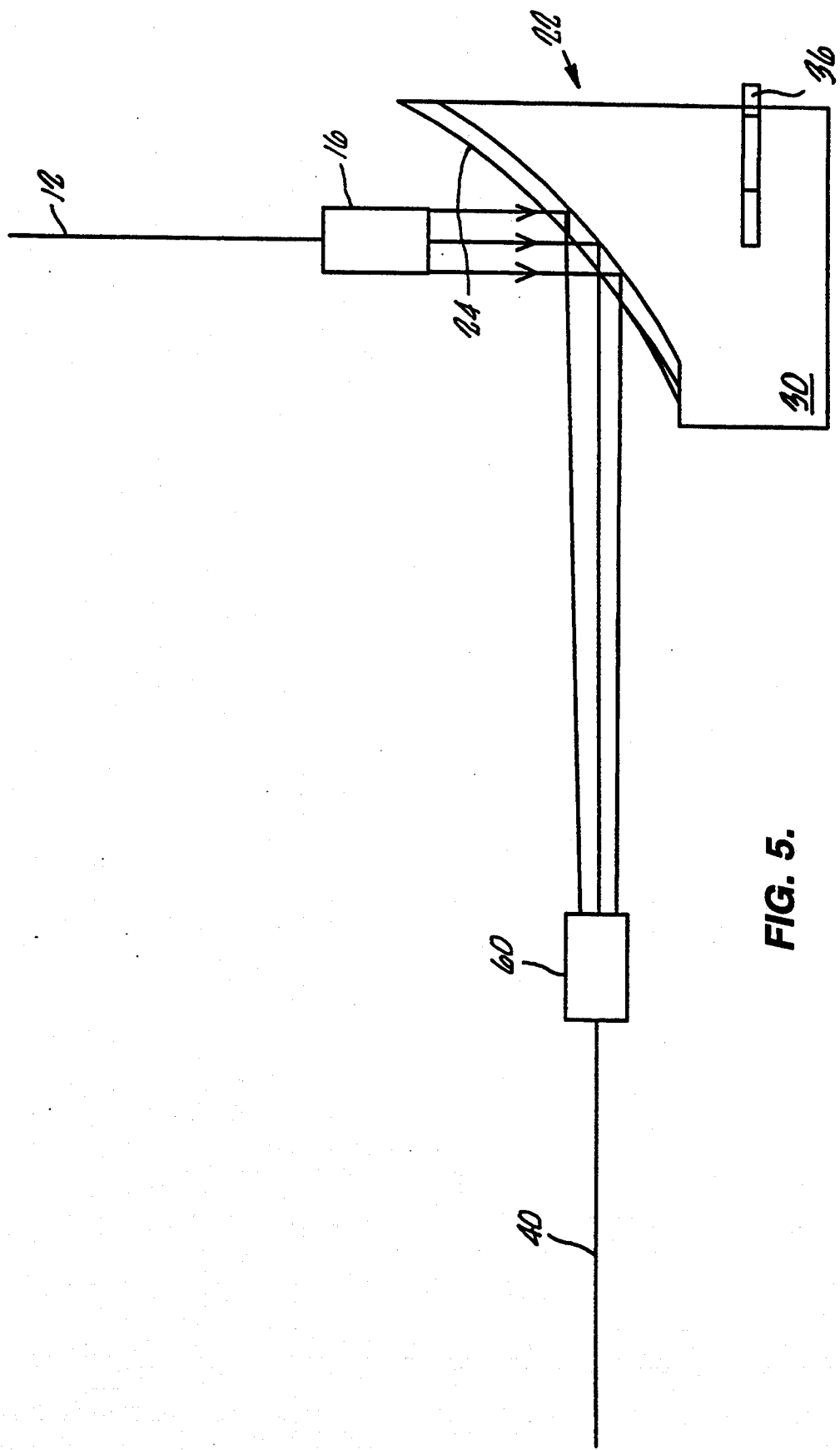
FIG. 5 shows the light path of an input light signal using an embodiment of the invention.

The light path of the first embodiment is shown in FIG. 5. The light beam is transmitted by input fiber 12, through GRIN lens 16 (which preferably is of one-quarter wavelength pitch). The input fiber 12, which is perpendicular to the plane containing output fibers 40 ... n plane, transmits a light beam that is reflected by curved reflector 24, which is tilted at a forty-five degree angle with respect to input fiber 12. The curved reflector 24 may be spherical, parabolic or elliptical. The curved reflector 24 reflects the light beam to one of the plurality of output fibers 40 ... n.

The curvature of the curved reflector 24 acts to focus the light beam, as shown in FIG. 5, onto one of the plurality of output fibers 40 ... n, which has a GRIN lens 60 in front of it. Because the curved reflector 24 will focus the light to an area smaller than that of the diameter of GRIN lens 60, slight shifts in curved reflector 24 location or small output fiber 40 ... n misalignment will not affect performance in a harmful fashion. The light transmitted from input fiber 12 will still be completely reflected to the proper output fiber 40 ... n. Therefore, the use of a curved reflector 24 results in a very stable light coupling device. Note that when curved reflector 24 is used, a GRIN lens with less than one-quarter pitch must be used in order to avoid increased insertion losses.

Figure 6:
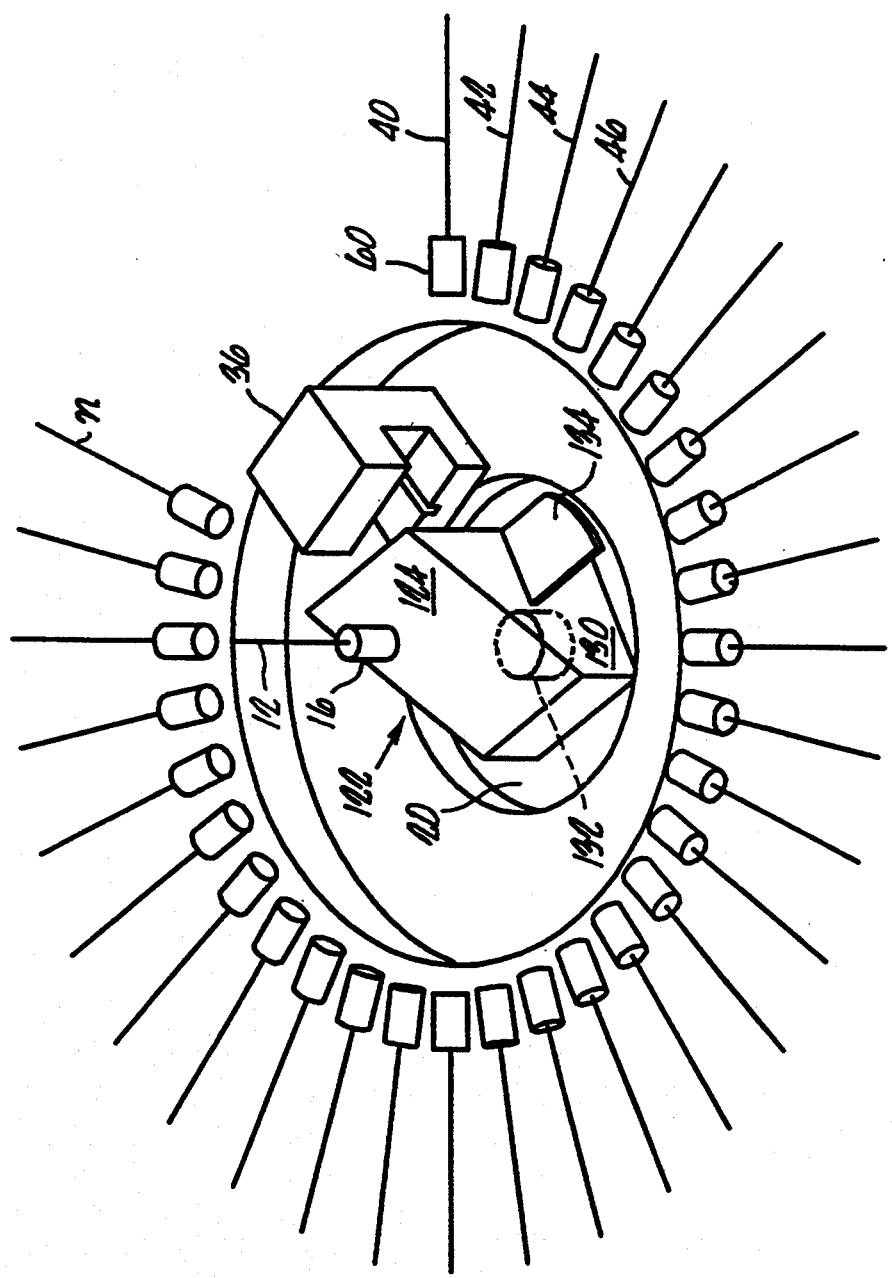
FIG. 6 is an expanded view of an embodiment of the invention showing an input fiber, rotating flat mirror and fixed output fiber apparatus.

In another embodiment of the invention, shown in FIG. 6, a flat reflector 124 is used on the reflector assembly 122 in lieu of the curved reflector 24. The mirror assembly 122 of this embodiment comprises flat reflector 124, mounting base 130, mounting hole 132 and zero position plate 134. The flat reflector 124 is disposed at a forty-five degree angle with respect to the input fiber 12. When the flat reflector 124 rotates about the shaft 28 of motor 26 (which are shown in fig. 1), the light beam transmitted from the input fiber 12 will switch from one output fiber 40 ... n to another. The output fiber 40 ... n, GRIN lens 60, platform 14, recess 20, input fiber 12, GRIN lens 16, optical interrupter 36, motor 26 and shaft 28 layout in the flat reflector embodiment is the same as in FIGS. 3 and 4.

Figure 7:
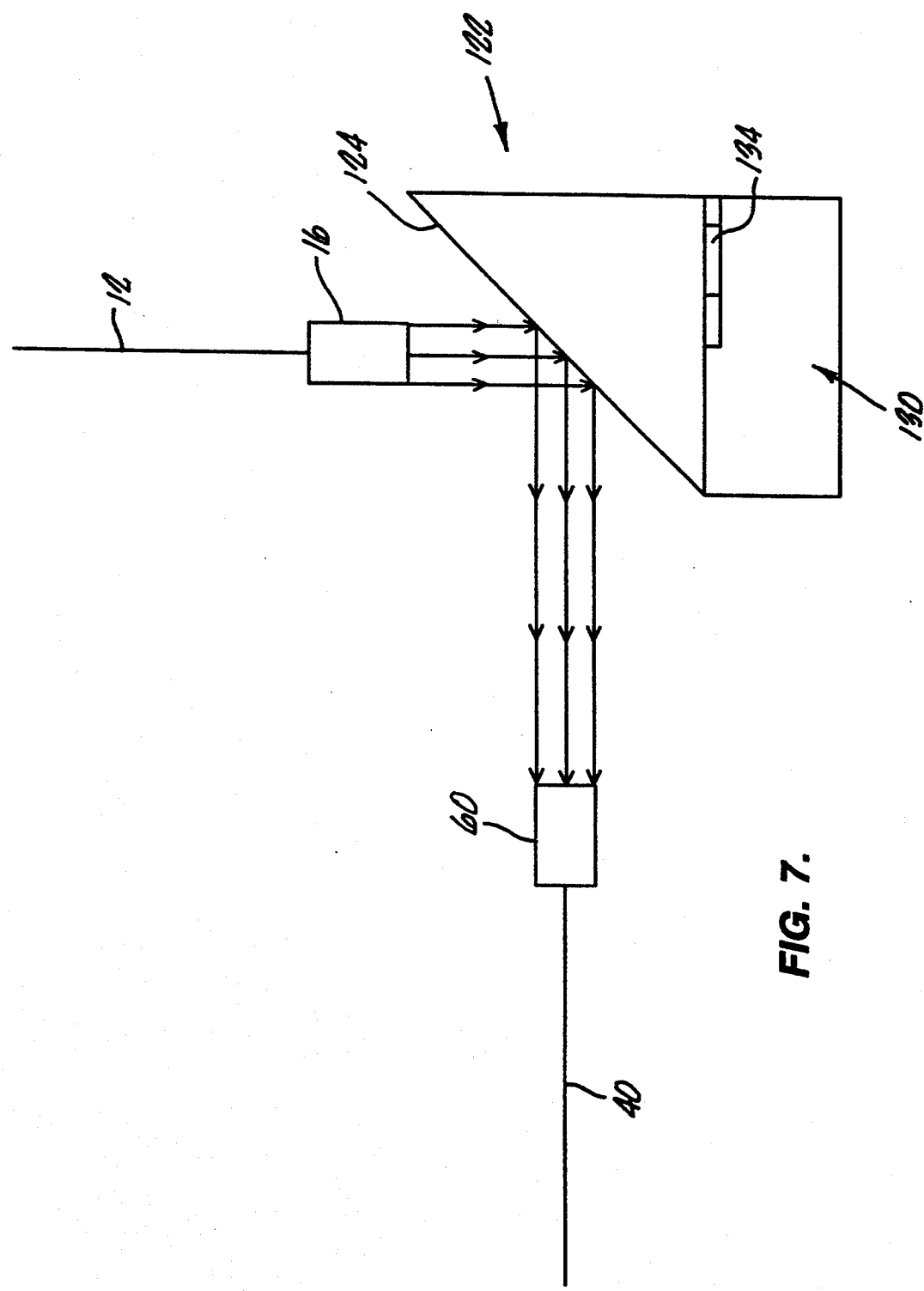
FIG. 7 shows the light path of an input light signal using another embodiment of the invention.

The light path of the flat reflector embodiment is shown in FIG. 7. The light beam is transmitted by input fiber 12, through GRIN lens 16 (which preferably is of one-quarter wavelength pitch), just as in the curved reflector embodiment. The input fiber 12, which is perpendicular to the plane containing the plurality of output fibers 40 ... n, transmits a light beam that will be reflected by flat reflector 124. The flat reflector 124 is tilted at a forty-five degree angle with respect to the input fiber 12 and reflects the light beam to one of the plurality of output fibers 40 ... n.

Because flat reflector 124 is tilted at a forty-five degree angle with respect to the input fiber 12, the light beam, as shown in FIG. 6, reflects at a right angle (ninety degrees) from the input fiber 12, to the output fiber plane. When properly aligned, the reflected signal will be reflected to one of the output fibers 40 ... n. Each output fiber 40 ... n has a GRIN lens 60 placed in front of it.

The flat reflector 124 embodiment is slightly less stable than the curved reflector 24 embodiment. This is because the flat reflector 124 does not focus the input light beam onto the output fiber 40 ... n, as does curved reflector 24 (see FIG. 7). Note, however, that when curved reflector 24 has small size and large radius, it will have stability characteristics similar to that of flat reflector 124. Therefore, while use of a curved reflector 24 is preferred, performance is not greatly reduced by use of a flat reflector 124.

FIG. 8.1 shows an additional embodiment where a reflector assembly 222 comprising base 230, zero position plate 236 and curved mirror 224 is tilted downward at an angle X. The angle X is the angle between the reflection plane formed at the point the input light beam strikes the mirror 224 when the reflector assembly 222 is not tilted downward and the reflection plane formed at the point the input light beam strikes the mirror 224 when the reflector assembly 222 is tilted downward. The reflector assembly 222 still rotates about the shaft 28 of motor 26 and input fiber 212 is still placed perpendicular to the horizontal plane. The light transmitted by input fiber 212 and through GRIN lens 216 is reflected by the curved mirror 224. Because the mirror is tilted at X degrees, the output fibers 240 ... n (and the GRIN lens 260 disposed thereon) must be disposed at an angle of 2X degrees with respect to the horizontal plane. Thus, the plurality of output fibers 240 ... n will no longer be in the same plane, but instead will be placed on a platform (not shown) shaped as a wedge cylinder. The embodiment shown in FIG. 8.2 is similar to that of FIG. 8.1. The only difference is that a flat mirror 225 is used on the reflector assembly 222 instead of the curved mirror 224.

FIG. 9.1 shows an additional embodiment where a reflector assembly 322 comprising base 330, zero position plate 336 and curved mirror 324 is tilted upwards at an angle $-X$. The angle $-X$ is the angle between the reflection plane formed at the point the input light beam strikes the mirror 324 when the reflector assembly 322 is not tilted upward and the reflection plane formed at the point the input light beam strikes the mirror 324 when the reflector assembly 322 is tilted upward. The reflector assembly 322 still rotates about the shaft 28 of motor 26 and input fiber 312 is still placed perpendicular to the horizontal plane. The light transmitted by input fiber 312 and through GRIN lens 316 is reflected by the curved mirror 324. Because the mirror is tilted at $-X$ degrees, the output fibers 340 ... n (and the GRIN lens 360 disposed thereon) must be disposed at an angle of $-2X$ degrees (with respect to the horizontal plane. Thus, the plurality of output fibers 240 ... n will no longer be in the same plane, but instead will be placed on a platform (not shown) shaped as a wedge cylinder. The embodiment shown in FIG. 9.2 is similar to that of FIG. 9.1. The only difference is that a flat mirror 325 is used on the reflector assembly 322 instead of the curved mirror 324.

Having thus described my invention, what I claim as new and desire to secure by Letters Patent of the United States of America is:

1. An optical coupling device comprising:
    a plurality of fixed optical output devices disposed on a platform in a first plane;
    a rotatable reflector assembly comprising a single reflective surface, said rotatable reflector assembly centrally disposed in said platform and having said plurality of fixed optical output devices aimed thereat, said rotatable reflector assembly comprising a reflector base, a curved reflector disposed at an angle such that said light beam transmitted by said fixed optical input device reflects in proper alignment with said selected one of said plurality of fixed optical output devices, and a zero position plate disposed on said reflector base;

a fixed optical input device disposed adjacent said rotatable reflector assembly in a second plane, said second plane being arranged substantially non-parallel to said first plane; and a reflector assembly rotator comprising a rotator axis, said fixed optical input device collinear with said rotator axis, said rotator axis substantially non-parallel to said first plane, said reflector assembly rotator capable of rotating said rotatable reflector assembly about said rotator axis such that said rotatable reflector assembly can reflect a light beam transmitted by said fixed optical input device off said single reflective surface without said light beam passing through said rotatable reflector assembly to a selected one of said plurality of fixed optical output devices.

2. The optical coupler of claim 1 wherein said rotatable reflector assembly is disposed at an angle such that said light beam transmitted by said fixed optical input device reflects off said rotatable reflector assembly at an angle greater than ninety degrees.

3. The optical coupler of claim 1 wherein said curved reflector comprises a front coated curved reflector.

4. The optical coupler of claim 3 wherein said curved reflector is a parabolic mirror.

5. The optical coupler of claim 3 wherein said curved reflector is a spherical mirror.

6. The optical coupler of claim 3 wherein said curved reflector is an elliptical mirror.

7. The optical coupler of claim 1 further comprising an optical interrupter, said optical interrupter comprising a light source tab and an optical detector tab disposed opposite each other, said light source tab having a light source disposed thereon and said optical detector tab having an optical detector disposed thereon, said light source and said optical detector in optical communication, said light source tab and said optical detector tab integrally connected by an extension such that a space is formed.

8. The optical coupler of claim 7 further comprising a rotation controller in communication with said optical detector so that when said rotatable reflector assembly is in said zero position, said zero position plate enters said space thereby breaking optical communication between said light source and said optical detector, thereby notifying said rotation controller that said rotatable reflector assembly is in said zero position, said rotation controller being programmed with how far each of said plurality of fixed optical output devices are disposed from each other so that said rotatable reflector assembly can be turned by said reflector assembly rotator in order to aim said light beam from said fixed optical input device to a selected one of said plurality of fixed optical output devices.

9. The optical coupler of claim 1 wherein said fixed optical input device is perpendicular to said plurality of fixed optical output devices.

10. The optical coupler of claim 1 wherein said fixed optical input device and said plurality of fixed optical output devices comprise optical fibers.

11. The optical coupler of claim 1 wherein said rotatable reflector assembly comprises:
a reflector base;
a flat reflector disposed at an angle such that a light beam transmitted by said fixed optical input device reflects in proper alignment with said selected one of said plurality of fixed optical output devices; and
a zero position plate disposed on said reflector base.

12. The optical coupler of claim 1 wherein said reflector assembly rotator comprises a motor.

13. The optical coupler of claim 12 wherein said motor comprises a stepper motor.

14. The optical coupler of claim 1 wherein said fixed optical input device functions as an optical output device and said plurality of fixed optical output devices function as a plurality of fixed input devices.

15. The optical coupler of claim 1 wherein said rotatable reflector assembly is disposed at an angle such that said light beam transmitted by said fixed optical input device reflects off said rotatable reflector assembly at an angle less than ninety degrees.

16. An optical coupling device comprising:
a plurality of fixed optical output devices disposed on a platform in a first plane;
a reflector assembly comprising a single curved reflective surface, said reflector assembly disposed in the center of said platform and having said plurality of fixed optical output devices aimed thereat;
a fixed optical input device in a second plane, said second plane being substantially perpendicular to said first plane; and
rotating means for rotating said reflector assembly about a rotator axis, said fixed optical input device collinear with said rotator axis, said rotator axis being substantially perpendicular to said first plane, said rotating means capable of rotating said reflector assembly at least one-hundred eighty degrees about said rotator axis such that said reflector assembly can reflect a light beam transmitted by said fixed optical input device to a selected one of said plurality of fixed optical output devices.

17. A fiber optic coupling device comprising:
a plurality of fixed output fibers disposed on a platform in a first plane;
a rotatable reflector assembly disposed in the center of said platform and having said plurality of fixed output fibers aimed thereat, said rotatable reflector assembly comprising a zero position plate;
an optical interrupter disposed on said platform comprising a light beam transmitter and an optical receiver, said light beam transmitter and said optical receiver in optical communication in a space formed in said optical interrupter;
a fixed input fiber disposed over said rotatable reflector assembly in a second plane, said second plane being substantially perpendicular to said first plane; and
a reflector assembly rotator comprising a rotator axis, said reflector assembly rotator capable of rotating said rotatable reflector assembly three-hundred sixty degrees about said rotator axis such that said rotatable reflector assembly can reflect a light beam emitted from said fixed input fiber to a selected one of said plurality of fixed output fibers, and such that said zero position plate enters said space in said optical interrupter once during every rotation such that optical communication between said light beam transmitter and said optical receiver is broken, thereby indicating to a control unit in communication with said optical receiver that said rotatable reflector assembly is in an initial position.

18. The fiber optic coupler of claim 17 wherein said rotatable reflector assembly further comprises a curved mirror.

19. The fiber optic coupler of claim 18 wherein said curved mirror comprises a parabolic mirror.

20. The fiber optic coupler of claim 18 wherein said curved mirror comprises a spherical mirror.

21. The fiber optic coupler of claim 18 wherein said curved mirror comprises an elliptical mirror.

22. The fiber optic coupler of claim 17 wherein said control unit has output fiber quantity information and output fiber spacing information stored therein so that when said rotatable reflector assembly is in said initial position, said control unit can calculate how much said rotatable reflector assembly rotator should rotate said rotatable reflector assembly so that said light beam emitted from said fixed input fiber is reflected to said selected one of said plurality of fixed output fibers.

23. The fiber optic coupler of claim 17 wherein said control unit comprises a microcontroller.

24. The fiber optic coupler of claim 17 wherein said reflector assembly rotator comprises a motor.

25. The fiber optic coupler of claim 24 wherein said motor comprises a stepper motor.

26. A fiber optic coupling device comprising:
a plurality of output fibers disposed on a platform;
a reflector assembly disposed in the center of said platform and having said plurality of output fibers aimed thereat, said reflector assembly comprising a zero position plate;
an optical interrupter disposed on said platform comprising a light beam transmitter and an optical receiver, said light beam transmitter and said optical receiver in optical communication in a space formed in said optical interrupter;
a fixed input fiber, said fixed input fiber located in a plane different from that of said plurality of output fiber; and
rotating means for rotating said reflector assembly about a rotator axis, said rotating means capable of rotating said reflector assembly about said rotator axis such that said reflector assembly can reflect a light beam emitted from said fixed input fiber to a selected one of said plurality of output fibers, and such that said zero position plate enters said space in said optical interrupter once during every rotation such that optical communication between said light beam transmitter and said optical receiver is broken, thereby indicating to a control unit in communication with said optical receiver that said reflector assembly is in an initial position.

27. A method of selecting a desired optical output device from a plurality of output devices comprising;
setting a flag indicative of an initial reflector assembly position in a reflector assembly controller, said reflector assembly controller having optical output device quantity and optical output device spacing available and said reflector assembly being rotatably mounted on a rotator;
indicating the desired optical output device;
calculating how much said reflector assembly must be rotated in order to reflect an optical beam from an optical input device to the desired optical output device, thereby creating a calculated amount; and
rotating said reflector assembly by said calculated amount.

28. An optical coupling device comprising:
a plurality of fixed optical output devices disposed on a platform in a first plane;
a rotatable reflector assembly centrally disposed in said platform and having said plurality of fixed optical output devices aimed thereat;
a fixed optical input device disposed adjacent said rotatable reflector assembly in a second plane, said second plane being arranged substantially non-parallel to said first plane;
a reflector assembly rotator comprising a rotator axis, said reflector assembly rotator capable of rotating said rotatable reflector assembly about said rotator axis such that said rotatable reflector assembly can reflect a light beam transmitted by said fixed optical input device to a selected one of said plurality of fixed optical output devices; and
said rotatable reflector assembly comprising a reflector base, a curved reflector disposed at an angle such that said light beam transmitted by said fixed optical input device reflects in proper alignment with said selected one of said plurality of fixed optical output devices, and a zero position plate disposed on said reflector base.

* * * * *